Nov. 26, 1963

H. T. PEDERSON 3,112,431

TRANSISTOR SWITCH

Filed Oct. 19, 1961

INVENTOR.
HELMER T. PEDERSON

BY Huebner & Worrel

ATTORNEYS.

United States Patent Office 3,112,431

Patented Nov. 26, 1963

3,112,431

TRANSISTOR SWITCH

Helmer T. Pederson, Solana Beach, Calif., assignor to Modutronics, Inc., Solana Beach, Calif., a corporation of California Filed Oct. 19, 1961, Ser. No. 146,290
19 Claims. (Cl. 317—148.5)

Figure 1:
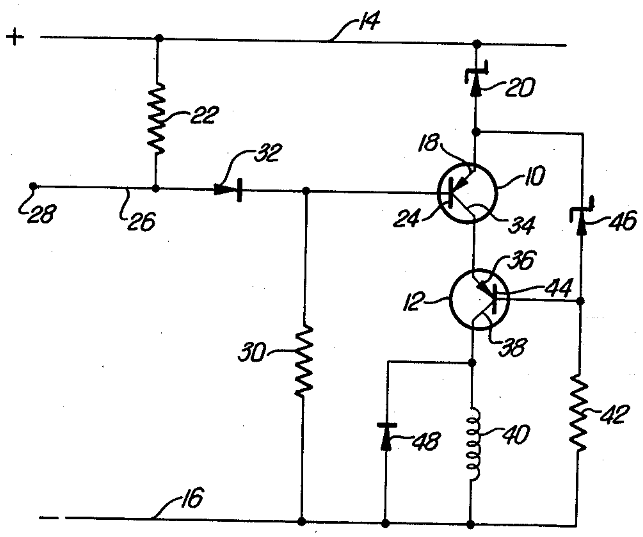

The present invention relates to transistor circuits, and it relates particularly to a novel transistor circuit wherein a transistor is maintained in a non-conducting state without external bias or excessive bias voltages through a wide temperature range, the circuit having particular utility as a transistor switch for controlling the pull-in and drop-out voltages of a relay or other load.

Conventional transistor circuits currently widely used and recommended by transistor manufacturers as switches for driving a relay, solenoid or other comparable load, have several serious limitations. One of these is the requirement of a separate external biasing voltage from the power supply in order to provide the necessary cutoff voltage for the switching transistor. Another limitation or problem in connection with such prior art circuits is that substantial temperature variations result in rather large variations in the amount of bias necessary for cutoff and in the signal required for switching. For example, in tests of a typical prior art circuit of this kind recommended by several transistor manufacturers, at 75° C. the external bias necessary for cutoff was 7.6 volts, and the signal needed to switch was 0.3 volt. At 25° C. the bias required for cutoff was 2.9 volts and a switching signal of 3.2 volts was necessary. At −55° C. the required bias was 0.5 volt and the switching signal had to be 8 volts.

In view of these and other problems in the art, it is an object of the present invention to provide a transistor circuit in which a transistor is maintained in a non-conducting state without external bias.

Another object of the invention is to provide a transistor circuit of the character described for selectively maintaining a transistor in a non-conducting state or causing conduction of the transistor, which is particularly useful as a transistor switching circuit for controlling the pull-in and drop-out voltages of a relay or other load, wherein only a very small amount of internal bias voltage and a very small switching signal voltage are required, and wherein the required bias and signal voltages vary only nominally over a wide temperature range. For example, in the present invention, utilizing the same transistors as in the tests of a typical prior art circuit as outlined above, the bias required for cutoff varied only from 0.5 volt at 75° C. to 0.7 volt at −55° C., while the signal necessary for swiching varied only from 0.3 volt at 75° C. to 0.5 volt at −55° C.

A further object of the present invention is to provide a transistor switch which is useful for controlling or driving a number of different devices, including but not limited to electrical and mechanical relays, heating units, and other electrically actuated devices, and which is adapted to be actuated by various means, including but not limited to potentiometers, heat sensitive bridge circuits, low current mechanical switches, and others.

Figure 2:
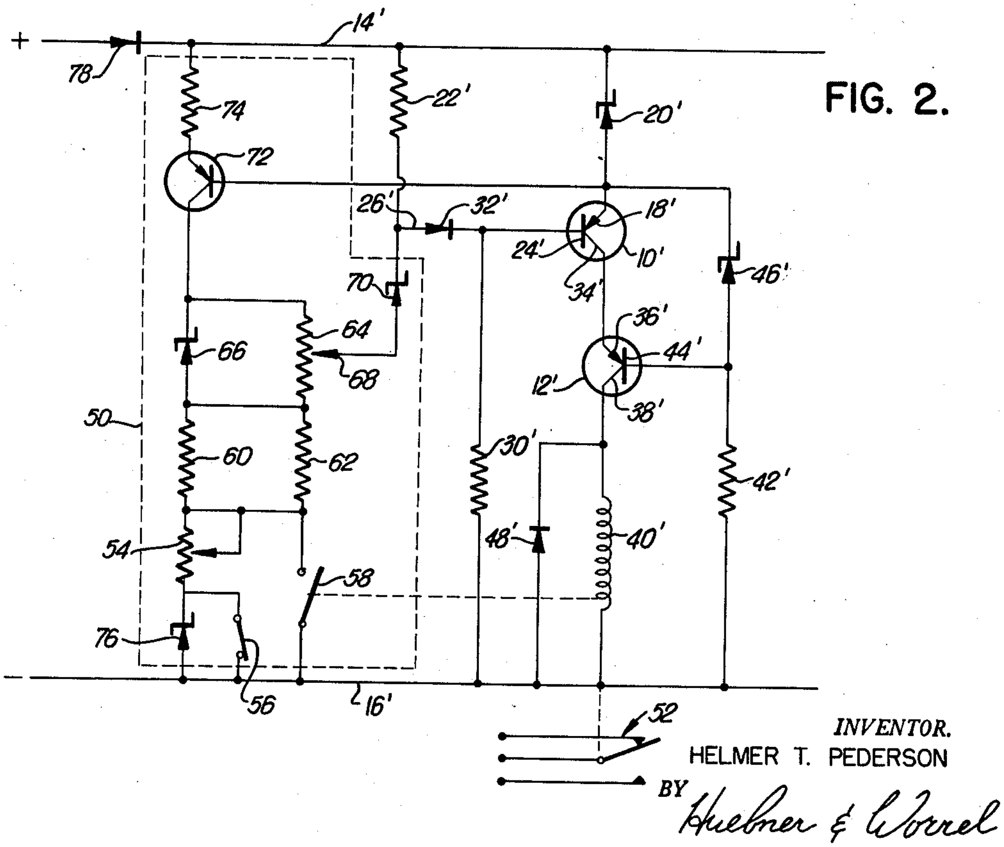

Further objects and advantages of this invention will appear during the course of the following part of this specification wherein the circuit details and mode of operation of presently preferred embodiments of the invention are described with reference to the accompanying drawing, in which:

FIG. 1 is a wiring diagram showing a presently preferred basic circuit in accordance with the present invention; and FIG. 2 is a wiring diagram illustrating a circuit arrangement wherein the basic circuit of FIG. 1 is employed to control the operation of an electrical relay.

Referring at first to FIG. 1 of the drawing, the basic circuit of the present invention which is there illustrated includes a pair of transistors 10 and 12, the transistor 10 being the switching transistor which is selectively maintainable in either a non-conducting state or is permitted to conduct according to an input signal which may be applied to the circuit, and the transistor 12 being an emitter-controlled amplifier for the load. The basic circuit illustrated in FIG. 1 employs transistors 10 and 12 which are of the P-N-P type, but it is to be understood that N-P-N type transistors may be employed by reversing the circuit polarities to conform to the N-P-N transistor polarities.

Electrical energy is supplied to the circuit of FIG. 1 through positive and negative input conductors 14 and 16, respectively. The emitter 18 of the control or switching transistor 10 is electrically connected to positive input conductor 14, with a semiconductor diode 20 disposed in this connection. The diode 20 provides the cutoff voltage for the transistor 10. Since the transistor 10 is operated at a very low potential, it requires only about 0.5 volt for cutoff, and accordingly the diode 20 need only provide a voltage drop on the order of about 0.5 volt or slightly more. For example, if desired, the diode 20 may comprise a silicon diode having a voltage drop of about 0.6 volt.

The biasing circuit for the control or switching transistor 10 is completed by electrical connection of a base resistor 22 between the positive input conductor 14 and the base 24 of transistor 10. In the circuit arrangement shown in FIG. 1, one side of base resistor 22 is connected to positive input conductor 14, while the other side of resistor 22 is connected to a conductor 26 which is in turn connected to the base 24 of transistor 10. The input signal for controlling the cutoff or conducting condition of transistor 10 is applied to the conductor 26, and may be introduced at a suitable terminal means 28.

Preferably, but not necessarily, a current limiting resistor 30 is connected between conductor 26 and negative input conductor 16 so as to limit the base current of transistor 10. The resistor 30 is of such value as to permit saturation current for transistor 10 when transistor 10 is in the conducting state. So that the current limiting effect of resistor 30 will not be disturbed by the circuit (not shown) which is connected to the conductor 26 for providing the control signal, it is preferable to provide an isolation diode 32 in conductor 26 between resistors 22 and 30.

The collector 34 of transistor 10 is connected to the emitter 36 of the amplifier transistor 12, and the collector 38 of transistor 12 is connected to one side of the load 40, the other side of load 40 being connected to the negative input conductor 16. The circuit, including load 40, from collector 38 of transistor 12 to negative input conductor 16 may be referred to as output circuit means of the invention. Base current is supplied to transistor 12 through base current resistor 42 which is connected at one side to the base 44 of transistor 12 and at its other side to the negative input conductor 16.

A diode 46 is connected between the emitter 18 of transistor 10 and the base 44 of transistor 12, and the voltage drop across diode 46 is to be in excess of the saturation voltage of transistor 10. Accordingly, the voltage drop across diode 46 will be dependent upon the type of transistor employed for the transistor 10, and the voltage drop across diode 46 will control the sharpness of the switching action of transistor 10. The closer the voltage drop across diode 46 is to the saturation voltage of transistor 10, the smaller the input signal variations which are required for switching the transistor 10.

If the signal differential for switching is not required to be particularly small, the diode 46 may be replaced by a resistor in which the IR drop would be in excess of the saturation voltage of transistor 10. However, where such a resistor is employed as a substitute for diode 46, the circuit is more likely to be varied by temperature changes than where the diode 46 is used, so that greater temperature compensation must be employed in the circuit which provides the signal.

A further diode 48 is shown in FIG. 1 connected across the load 40. This diode 48 is only required where the load 40 is inductive, in order to protect the amplifier transistor 12 from transients.

The operation of the circuit illustrated in FIG. 1 is as follows: Without a signal input at terminal means 28, the biasing voltage established across diode 20 will cause the emitter 18 of transistor 10 to be at a lower electrical potential than the base 24 of transistor 10, whereby the transistor 10 will be in a non-conducting or cutoff condition. In this condition, the amplifier transistor 12 will not receive current from the control transistor 10, and hence will not provide current to the load 40. However, when a signal applied to terminal means 28 reduces the electrical potential of base 24 of the control transistor 10 to a value that is below the electrical potential of emitter 18 as established by diode 20, then the transistor 10 is sharply switched to its conducting condition, in which saturation current will flow through transistor 10, so that the transistor 12 will supply amplified current to the load 40.

It is to be noted that in the cutoff condition of the control or switching transistor 10, the only current in the amplifier transistor 12 wil be the diode current (base to collector current), which is minimal, and is specified in the transistor manuals as cutoff current in the collector with the emitter open.

When the signal provided to terminal means 28 is such that the base 24 of control transistor 10 is again above the potential of the emitter 18, the transistor 10 will again be in its cutoff condition to cut off the current provided to the load 40.

The aforesaid description of the operation of the basic circuit shown in FIG. 1 presumes a fixed voltage between the positive and negative input conductors 14 and 16, with signals being provided to the circuit from an external source (not shown) operatively connected to terminal means 28. Examples of such external signal sources, to which the present invention is not necessarily limited, are photocells, thermistors and other temperature sensitive or temperature sensing units, amplifiers of the class B, AB1 and AB2 types, and proportional controls for servo amplifiers, heater elements and other devices.

The basic circuit shown in FIG. 1 may also be employed where the voltage across input conductors 14 and 16 varies, and it is desired to have the control or switching transistor 10 shift between its cutoff and its conducting conditions in response to variations of the potential between the input conductors 14 and 16. An example of this type of use of the basic circuit shown in FIG. 1 is illustrated and described in connection with FIG. 2 of the drawing.

Referring now specifically to FIG. 2, in this figure the circuit elements that correspond to the various circuit elements in FIG. 1 are designated by like reference numerals which are primed. In the structure of FIG. 2, what may be termed the input signal that is fed to conductor 26′ is developed in a bridge circuit broadly designated by the reference numeral 50, it being understood that this input signal is only a signal insofar as it is related to variations in the potential across the positive and negative input conductors 14′ and 16′, respectively.

The load 40′ in the circuit of FIG. 2 is a relay having output contact means 52, and it is the purpose of the circuit shown in FIG. 2 to precisely control the pull-in and drop-out voltages for the relay 40′; i.e., the voltages across input conductors 14′ and 16′ at which the relay 40′ will pull in and drop out, this control being adjustable both as to the voltage differential between pull-in and drop-out and as to the voltage range for pull-in and drop-out, and also being practially completely temperature compensated.

Starting at the negative input conductor 16′, bridge circuit 50 includes a variable resistor 54, one end of which is electrically connected to negative input conductor 16′ through a normally closed switch 56. The variable resistor 54 may be a potentiometer, such as a trim potentiometer, hooked up as a variable resistor. A normally open switch 58, comprising contacts of the relay 40′, is electrically connected across the variable resistor 54, so that when the relay 40′ is pulled in, the relay switch 58 will close and short out the variable resistor 54.

Next in the bridge circuit 50 is a parallel combination of a resistor 60 and a thermistor 62, the thermistor 62 having a high negative temperature resistance coefficient, this combination of resistor 60 and thermistor 62 providing temperature compensation as will hereinafter be more fully described. One end of this parallel combination of resistor 60 and thermistor 62 is connected to variable resistor 54, while the other end is connected to a parallel combination comprising a potentiometer 64 and a zener diode 66 which establishes a fixed voltage drop across the potentiometer 64. The movable contact 68 of potentiometer 64 is connected to the input conductor 26′ through a zener diode 70, which has a value selected to give the desired drop-out voltages as will hereinafter be more fully apparent. The principal purpose of the temperature compensating combination of resistor 60 and thermistor 62 is to provide temperature compensation for this zener diode 70.

The bridge circuit 50 is completed by a transistor 72 which has its collector connected to the combination of zener diode 66 and potentiometer 64, and which has its emitter connected through a current limiting resistor 74 to the positive input conductor 14′. The base of transistor 72 is connected to the low potential side of diode 20′. The circuit of transistor 72 constitutes a constant current transistor circuit, which maintains a constant current through the bridge circuit 50 and accordingly a constant voltage drop across variable resistor 54 for any particular setting of variable resistor 54, provided the relay switch 58 is open. This constant voltage drop across variable resistor 54 will be maintained despite resistance changes in the temperature compensating parallel combination of resistor 60 and thermistor 62 because of the constant current through bridge circuit 50.

The voltage drop across the variable resistor 54 determines the voltage differential between pull-in and drop-out of the relay 40′, as will become apparent during the description set forth hereinafter of the operation of the circuit of FIG. 2. In the event a greater voltage differential between pull-in and drop-out is desired than can be provided across the variable resistor 54, an additional voltage differential may be provided by means of a zener diode 76 positioned in series with variable resistor 54 between variable resistor 54 and negative input conductor 16′. This zener diode 76 is normally shorted out by the normally closed switch 56, and can be introduced into the circuit to increase the available differential between pull-in and drop-out of the relay merely by opening the switch 56.

The pull-in voltage, i.e. the voltage across the positive and negative input conductors 14′ and 16′ which is required to pull in the relay 40′, is determined by the sum of the voltage across diode 20′, diode 32′, diode 70, potentiometer 64, the parallel combination of resistor 60 and thermistor 62, and the variable resistor 54. When the voltage across input conductors 14′ and 16′ reaches the pull-in value, the emitter 18′ of the switching transistor 10′ will become more positive than the base 24′ of this transistor, so that transistor 10′ will conduct and cause current to be provided by the amplifier transistor 12′ to relay 40′. This pull-in of relay 40′ will cause the relay switch 58 to close, thus shorting out the variable resistor 54, so that the base 24′ of the control or switching transistor 10′ will then be further lowered in potential by the amount of the voltage drop across variable resistor 54 which is thus shorted out. Accordingly, the drop-out voltage across the input conductors 14′ and 16′ will be substantially equal to the pull-in voltage across conductors 14′ and 16′ less the voltage across the variable resistor 54 in the open condition of switch 58. When the voltage across the input conductors 14′ and 16′ is reduced to this drop-out value, the base 24′ of transistor 10′ will have risen in potential to the potential of the emitter 18′ of transistor 10′, thus cutting off transistor 10′ and cutting off the current to the relay 40′. When the relay 40′ thus becomes unactuated, the relay switch 58 will again open, and the circuit will be ready for a further similar sequence of operation.

It will be apparent from the foregoing description of the operation of the circuit shown in FIG. 2 that the minimum pull-in versus drop-out voltage differential will be present for a setting of variable resistor 54 for zero voltage across variable resistor 54, while the maximum pull-in versus drop-out voltage differential will be for the setting of variable resistor 54 for maximum voltage across variable resistor 54. This differential can be increased by opening the normally closed switch 56 to introduce zener diode 76 in series with variable resistor 54. Where the minimum differential between pull-in and drop-out is not required, the diode 46′ could be replaced by a suitable resistor, but such replacement would have the further disadvantage of decreasing the accuracy of the circuit under widely varying temperature conditions.

The value of the zener diode 70 is selected to give the desired approximate drop-out voltage, and the drop-out voltage may then be accurately selected over a desired voltage range by adjustment of the potentiometer 64.

It is desirable to include in the circuit of FIG. 2 a polarizing diode 78 to prevent circuit damage in the event the input conductors 14′ and 16′ are incorrectly connected to the power source. This polarizing diode 78 is shown as disposed in positive input conductor 14′. For alternating current operation of the structure shown in FIG. 2 this polarizing diode could be replaced by a suitable rectifying and filtering circuit (not shown).

The following table lists circuit components and values thereof for a test circuit which was established in accordance with FIG. 2. This table is given by way of example only, and not by way of limitation.

| | |
|---|---|
| Transistor 10′ | P-N-P germanium transistor. |
| Transistor 12′ | P-N-P germanium transistor. |
| Diode 20′ | 3.3 volt zener diode. |
| Resistor 22′ | 2200 ohms. |
| Resistor 30′ | 20K ohms. |
| Diode 32′ | Silicon diode. |
| Load 40′ | 6000 ohm relay coil. |
| Resistor 42′ | 4700 ohms. |
| Diode 46′ | 1.2 volt zener diode (may be replaced by 1000 ohm. resistor). |
| Diode 48′ | Silicon diode. |
| Variable resistor 54 | 300 ohm potentiometer. |
| Resistor 60 | 12 ohms. |
| Thermistor 62 | High negative temperature coefficient resistor. |
| Potentiometer 64 | 300 ohm potentiometer. |
| Diode 66 | 5 volt zener diode. |
| Diode 70 | 14 volt zener diode. |
| Transistor 72 | P-N-P germanium transistor. |
| Resistor 74 | 120 ohms. |
| Diode 76 | 4 volt zener diode. |
| Diode 78 | Silicon diode. |

In the foregoing example, the minimum pull-in versus drop-out switching differential was only approximately 0.2 volts, which is the differential when the variable resistor 54 is set for zero resistance. The maximum voltage drop across variable resistor 54 with the above circuit components is approximately 5 volts so that the pull-in versus drop-out switching differential with switch 56 closed may be adjusted as desired up to about 5 volts. With switch 56 open, the differential may be adjusted from between about 4 and about 9 volts. In this circuit, adjustment of the potentiometer 64 permits the drop-out voltage across input conductors 14′ and 16′ to be adjusted between a minimum of about 17 volts and a maximum of about 21 volts.

The circuit of FIG. 2 has been shown with all three transistors of the P-N-P type. This same circuit may be employed with N-P-N type transistors by orienting all polarities to conform to the N-P-N transistor polarities in accordance with common practice for converting transistor circuits from the P-N-P to the N-P-N type.

While the instant invention has been shown and described herein, in what are conceived to be the most practical and preferred embodiments, it is recognized that departures may be made therefrom within the scope of the invention, which is therefore not to be limited to the details disclosed herein, but is to be accorded the full scope of the claims.

I claim:

1. A transistor switching circuit which comprises D.C. input conductor means including a relatively high voltage conductor and a relatively low voltage conductor, a switching transistor and an amplifier transistor, the collector of the switching transistor being electrically connected to the emitter of the amplifier transistor, an electrical connection including a base resistor between one conductor and the base of said switching transistor, an electrical connection including a base resistor between the other conductor and the base of said amplifier transistor, biasing means connected between said one conductor and the switching transistor emitter for providing cutoff bias to the switching transistor, circuit means connected to the switching transistor emitter and to the amplifier transistor base for establishing a voltage between the switching transistor emitter and the amplifier transistor base at least as large as the switching transistor saturation voltage, and output circuit means electrically connected between the collector of said amplifier transistor and said other conductor, whereby the switching transistor will normally be in a non-conducting state and will not provide current to the amplifier transistor, and the application of a signal to the switching transistor base which overcomes the switching transistor biasing voltage will sharply switch the switching transistor to saturation current flow so as to provide current to the amplifier transistor.

2. A transistor switching circuit as defined in claim 1, wherein said biasing means includes a semiconductor diode.

3. A transistor switching circuit as defined in claim 1, wherein said first mentioned circuit means includes a semiconductor diode.

4. A transistor switching circuit as defined in claim 1, wherein said first mentioned circuit means includes a resistor.

5. A transistor switching circuit as defined in claim 1, wherein said first mentioned circuit means establishes a voltage between the switching transistor emitter and the amplifier transistor base which is substantially the same as the switching transistor saturation voltage.

6. A transistor circuit as defined in claim 1, which includes an isolation diode electrically connected to the switching transistor base through which said signal is applied.

7. A transistor circuit as defined in claim 1, wherein said output circuit means includes a load.

8. A transistor switching circuit which comprises a pair of input conductors having a D.C. voltage thereacross, a switching transistor having its emitter connected to one of said input conductors through a biasing diode which provides a biasing voltage to said switching transistor at least as great as the cutoff voltage of said switching transistor, first circuit means including a base resistor interconnecting said one input conductor and the base of said switching transistor, an emitter-controlled amplifier transistor having its emitter electrically connected to the collector of said switching transistor, second circuit means including a base resistor interconnecting the other input conductor and the base of said amplifier transistor, third circuit means connected to the switching transistor emitter and to the amplifier transistor base for establishing a voltage between the emitter of said switching transistor and the base of said amplifier transistor at least as large as the saturation voltage of said switching transistor, output circuit means electrically connected between the collector of said amplifier transistor and said other conductor, and signal input means electrically connected to the base of said switching transistor, whereby the switching transistor will normally be in a non-conducting state and will not provide current to the amplifier transistor, and signals applied to said signal input means which overcome the biasing voltage of the switching transistor will sharply switch the switching transistor to saturation current flow so as to provide current to the amplifier transistor.

9. A transistor switching circuit which comprises D.C. input conductor means including a relatively high voltage conductor and a relatively low voltage conductor, a switching transistor and an amplifier transistor, the collector of the switching transistor being electrically connected to the emitter of the amplifier transistor, an electrical connection including a base resistor between one conductor and the base of said switching transistor, an electrical connection including a base resistor between the other conductor and the base of said amplifier transistor, biasing means connected between said one conductor and the switching transistor emitter for providing cutoff bias to the switching transistor, circuit means connected to the switching transistor emitter and to the amplifier transistor base for establishing a voltage between the switching transistor emitter and the amplifier transistor base at least as large as the switching transistor saturation voltage, a load electrically connected between the amplifier transistor collector and said other conductor, a bridge circuit extending between said input conductors, and a signal input connection between said bridge circuit and the switching transistor base, whereby said cutoff bias will normally hold the switching transistor in a non-conducting state and current will not be supplied to the load, and the application of a signal from said bridge circuit through said signal input connection which overcomes the switching transistor biasing voltage will sharply switch the switching transistor to saturation current flow and current will be supplied to the load.

10. A transistor switching circuit as defined in claim 9, wherein said load comprises an electrical relay.

11. A transmitter switching circuit as defined in claim 9, wherein said bridge circuit includes an adjustable circuit element having an adjustable voltage drop thereacross, adjustment of said circuit element causing adjustment of the voltage of the switching transistor base relative to its emitter.

12. A transistor switching circuit as defined in claim 9, wherein said bridge circuit includes a constant current transistor circuit component.

13. A transistor switching circuit as defined in claim 12, wherein said bridge circuit includes a temperature compensating thermistor.

14. A transistor switching circuit for controlling the pull-in and drop-out voltages of a load, which comprises D.C. input conductor means including a relatively high voltage conductor and a relatively low voltage conductor, a switching transistor and an amplifier transistor, the collector of the switching transistor being electrically connected to the emitter of the amplifier transistor, an electrical connection including a base resistor between one conductor and the base of said switching transistor, an electrical connection including a base resistor between the other conductor and the base of said amplifier transistor, biasing means connected between said one conductor and the switching transistor emitter for providing cutoff bias to the switching transistor, circuit means connected to the switching transistor emitter and to the amplifier transistor base for establishing a voltage between the switching transistor emitter and the amplifier transistor base at least as large as the switching transistor saturation voltage, a load electrically connected between the amplifier transistor collector and said other conductor, a bridge circuit extending between said input conductors, a signal input connection between said bridge circuit and the switching transistor base, said bridge circuit including a circuit element having a voltage drop thereacross, and normally open switch means for electrically by-passing said circuit element, said switch means being coupled to said load and being closed upon energization of said load so as to increase the voltage differential between said one conductor and the switching transistor base as determined by said signal input connection from said bridge circuit, whereby when the voltage differential between said input conductors reaches a predetermined pull-in value the voltage differential between the switching transistor base and said one conductor as determined by said signal input connection from said bridge circuit will overcome the biasing voltage differential between said one conductor and the switching transistor emitter so as to sharply switch the switching transistor to saturation current flow and the load will become energized, energization of the load closing said switch means to close and increase the voltage differential between said one conductor and the switching transistor thus to establish a drop-out voltage differential between said input conductors at which said switching transistor is again biased to cut-off and the load is de-energized which is smaller than said pull-in voltage differential.

15. A transistor switching circuit as defined in claim 14, wherein said load comprises an electrical relay, and said switch means includes contacts of said relay.

16. A transistor switching circuit as defined in claim 14, wherein said circuit element is adjustable so as to adjust the voltage drop thereacross, adjustment of said circuit element causing an adjustment in the voltage differential between pull-in and drop-out of the load.

17. A transistor switching circuit as defined in claim 16, wherein said bridge circuit includes a second circuit element having an adjustable voltage drop thereacross, adjustment of said second circuit element causing adjustment of the load drop-out voltage.

18. A transistor switching circuit as defined in claim 17, wherein said bridge circuit includes a constant current transistor circuit component.

19. A transistor switching circuit as defined in claim 18, wherein said bridge circuit includes a temperature compensating thermistor.

References Cited in the file of this patent

UNITED STATES PATENTS

| | | |
|---|---|---|
| 3,032,690 | Elliot | May 1, 1962 |
| 3,048,744 | Warrington | Aug. 7, 1962 |
| 3,078,393 | Winston | Feb. 19, 1963 |

OTHER REFERENCES

Bohr, "Sensitive Relay Circuits," Radio-Electronics, January 1958, pp. 112, 114, 115.